United States Patent [19]

Garrett

[11] Patent Number: 4,934,860

[45] Date of Patent: Jun. 19, 1990

[54] PIVOTAL SHAFT FRICTIONLESS SUPPORT ARRANGEMENT

[75] Inventor: David A. Garrett, Albuquerque, N. Mex.

[73] Assignee: Honeywell Inc., Minneapolis, Minn.

[21] Appl. No.: 218,738

[22] Filed: Jul. 13, 1988

[51] Int. Cl.⁵ .................... F16C 11/00; F16D 1/12
[52] U.S. Cl. ................................ 403/291; 403/50; 403/57; 403/113; 403/146; 403/203; 74/471 XY
[58] Field of Search ............. 244/234; 403/291, 203, 403/166, 146, 120, 121, 113, 65, 57, 50; 74/471 XY; 137/636.1, 636.2, 636.3; 248/160; 267/162, 3

[56] References Cited

U.S. PATENT DOCUMENTS

| | | | |
|---|---|---|---|
| 1,826,597 | 10/1931 | Brecht | 267/162 |
| 2,482,449 | 9/1949 | Wells | 267/162 |
| 2,534,123 | 12/1950 | Hasselhorn | 267/162 |
| 2,565,108 | 8/1951 | Zahodiakin | 267/162 |
| 2,675,225 | 4/1954 | Migny | 267/162 |
| 2,713,482 | 7/1955 | Stapleton | 267/162 |
| 3,140,614 | 7/1964 | Willis | 403/291 X |
| 4,597,475 | 7/1986 | Lassig et al. | 403/50 |

FOREIGN PATENT DOCUMENTS 1193322 11/1985 U.S.S.R. .................... 267/162

Primary Examiner—Andrew V. Kundrat
Assistant Examiner—Franco S. Deliguori
Attorney, Agent, or Firm—Haugen and Nikolai

[57] ABSTRACT

A support arrangement which allows pivoting of a non-rotatable shaft has a flexure structure and a pair of axially-displaced inner and outer hubs respectively connected to, and disposed inwardly and outwardly of, the flexure structure. The flexure structure is composed of a disk-shaped flexural elements disposed in stacked, axially spaced relation to one another and connected peripherally one to the next. The flexural elements together define a frictionless, laterally stiff, fulcrum or pivot point about which the shaft can pivot through a predefined range of angular motion. The inner hub is attached to an inner end one of the flexural elements at an interior peripheral edge thereof, whereas the outer hub is attached to an outer end one of the flexural elements at an exterior peripheral edge thereof. The shaft extends axially through the bores in the hubs and an opening in the flexure structure along a common axis, and is rigidly attached to the inner hub. The outer hub which supports the inner hub and thus the shaft, via the flexure structure, is attached to an external support structure.

21 Claims, 1 Drawing Sheet

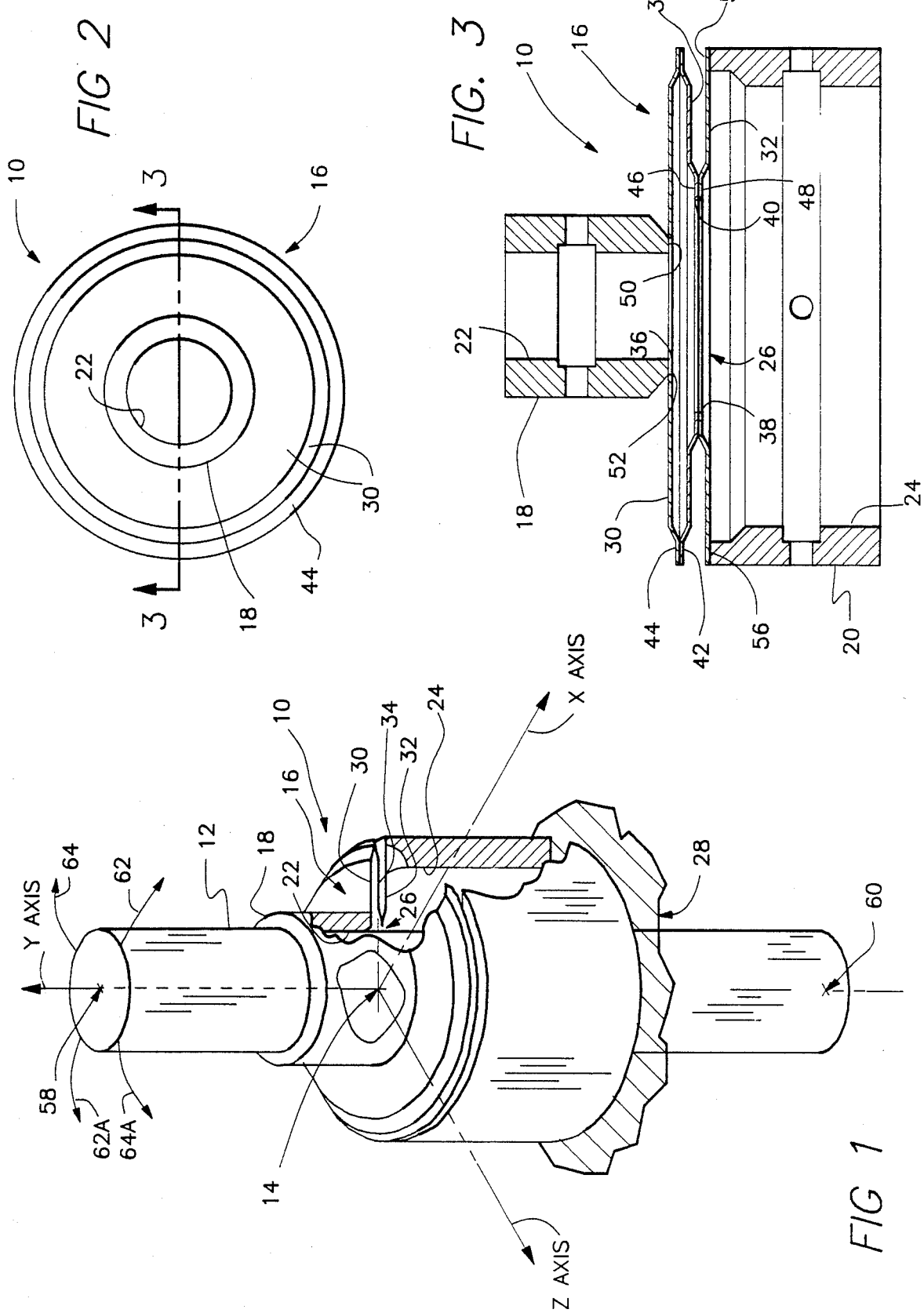

PIVOTAL SHAFT FRICTIONLESS SUPPORT ARRANGEMENT

BACKGROUND OF THE INVENTION

The Government has rights in this invention pursuant to Contract No. F33657-81-C-2108, awarded by the Department of the Air Force.

This invention was made with U.S. Government support and the U.S. Government has certain rights therein.

1. Field of the Invention

The present invention generally relates to pivotal shaft support arrangements and, more particularly, is concerned with a frictionless support arrangement for a non-rotating pivotal shaft.

2. Description of the Prior Art

A pivotal shaft designed for use as an aircraft control stick has two directional force sensors on one end and a counterweight on the other end for counteracting external lateral acceleration forces acting on the sensor masses. Acceptable functioning of the force sensors requires a support arrangement allowing pivoting of the shaft about a frictionless fulcrum point.

One approach to providing a fulcrum for a force sensor counterweight support shaft would be to use ball bearings. Self-aligning ball bearings are rarely used for such purpose due to the limited motion they undergo. Limited motion in ball bearings produces fretting or false brinelling. Spherical bushing type bearings have been used for such purpose.

However, the spherical bushing type bearings have always introduced unwanted friction into the force sensor and produced hysteresis and zero offset. This reduces the accuracy of the sensors. Buying more expensive, lower friction bearings, running the bearings for a short break-in period, and then selecting the best or lowest friction bearings would only reduce the friction problem.

Friction can never be eliminated from ball bearings as long as one surface rubs another. The effects of dirt, dust and corrosive elements present in the environment also increases friction between rubbing surfaces.

Therefore, a need exists for a different approach to designing a support arrangement which will provide a near-zero friction or frictionless fulcrum for a force sensor counterweight-supporting pivotal shaft.

SUMMARY OF THE INVENTION

The present invention provides a frictionless support arrangement for a non-rotating pivotal shaft designed to overcome the above-described friction problems encountered with ball bearings and to satisfy the aforementioned need. The solution of the present invention is to provide a shaft support arrangement incorporating a flexure structure which defines a frictionless, pivotable, laterally stiff, fulcrum or pivot point for a non-rotatable shaft. The flexure structure must have adequate support strength, while allowing for an adequate range of angular motion of the pivotal shaft and maintaining a compact size to minimize the space it occupies.

More particularly, the flexure structure of the shaft support arrangement is composed of a plurality of axially-symmetrical, peripherally-connected, annular-shaped disk-like flexural elements disposed in axially spaced relation to one another. The shaft support arrangement also includes a pair of axially-displaced annular-shaped inner and outer hubs disposed respectively inwardly and outwardly of the flexural elements of the flexure structure. The inner hub is attached at one end to one of the flexural elements at an interior peripheral edge thereof; the outer hub is attached at one end to one of the flexural elements at an exterior peripheral edge thereof.

With such construction, the shaft support arrangement contains no components with surfaces which rub one another.

Also, the effects of environmental dirt and dust are eliminated by the frictionless support arrangement of the present invention since no rubbing surfaces are employed therein. Furthermore, the effects of environmentally-induced corrosion can easily be eliminated with the proper selection of resistant materials.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a perspective view, partly cut away and sectioned, of a frictionless pivotal shaft support arrangement of the present invention.

FIG. 2 is a top plan view, on a smaller scale, of the shaft support arrangement of FIG. 1.

FIG. 3 is an enlarged longitudinal axial sectional view of the shaft support arrangement taken along line 3—3 of FIG. 2.

DETAILED DESCRIPTION OF THE INVENTION

Referring now to the drawings, and in particular to FIG. 1, there is shown a shaft support arrangement, generally designated by the numeral 10, which constitutes the preferred embodiment of the present invention. The shaft support arrangement 10 non-rotatably supports an elongated cylindrical shaft 12 for pivotal movement about a frictionless fulcrum or pivot point 14 defined by the support arrangement 10. Coordinate reference axes X, Y and Z are shown associated with the pivot point 14.

In its basic components, the shaft support arrangement 10 includes a central flexure structure 16 and attaching means in the form of a pair of axially-displaced inner and outer annular-shaped hubs 18, 20. The inner and outer hubs 18, 20 are respectively connected to, and disposed inwardly (or above) and outwardly (or below) of, the flexure structure 16. The shaft 12 extends axially through respective central bores 22, 24 defined in the hubs 18, 20 and through an opening 26 defined in the flexure structure 16 along a common axis, such being the Y axis as identified in FIG. 1, when the shaft 12 is in its unpivoted position seen in FIG. 1.

In particular, the outer hub 20 is rigidly connected by any suitable means to an external support structure 28 which also has a central opening (not shown) through which extends the shaft 12. The inner hub 18 is rigidly connected along its internal diameter by any suitable means to the elongated shaft 12 which extends therethrough. The outer hub 20 is larger in diameter than the inner hub 18 and so has sufficient annular space (not shown) between its internal diameter and the shaft 12 as the shaft passes through the central bore 22 of the inner hub to permit pivoting of the shaft 12 therewithin. Thus, the shaft 12 and inner hub 18 are mounted, via the flexure structure 16 and the outer hub 20, by the external support structure 28.

More particularly, referring also to FIGS. 2 and 3, the flexure structure 16 is composed of a plurality of annular disk-shaped flexural elements, namely, an inner end element 30, an outer end element 32 and a middle element 34 between them. The flexural elements 30, 32, 34 are configured at their peripheral edge portions such that they can be disposed in a stacked, axially symmetrical and spaced relation to one another along the common Y axis and still be connected peripherally one to the next.

The flexural elements 30, 32, 34 respectively have central openings 36, 38, 40 for receiving the shaft 12 therethrough. The flexural elements are composed of a stiff, resiliently-flexible, deformable compliant material, preferably corrosion-resistant, such as stainless steel being relatively thin in cross-section. Together the flexural elements 30, 32, 34 define the fulcrum or pivot point 14 about which the shaft 12 can pivot in a frictionless manner and provide a lateral stiffness generating a counterforce opposing the pivotal movement of the shaft 12 through a range of angular motion predefined by those elements. As can be seen in FIG. 1, the pivot point 14 is symmetrically aligned with the middle flexure element 34. In FIG. 1, the shaft 12 and flexure structure 16 are shown in their respective unpivoted and undeformed position.

As best seen in FIG. 3, the middle flexural element 34 is rigidly connected at its exterior peripheral edge 42 to an exterior peripheral edge 44 of the inner end flexural element 30 and at its interior peripheral edge 46 to an interior peripheral edge 48 of the outer end flexural element 32. The inner hub 18 at a lower edge 50 thereof is attached to the inner end flexural element 30 at an interior peripheral edge 52 thereof. The outer hub 20 at an upper edge 54 thereof is attached to the outer end flexural element 32 at an exterior peripheral edge 56 thereof. All attachments can take any suitable form, such as welds formed between the respective edge surfaces of the above-described components.

The small spaces between the flexural elements 30, 32, 34 in the stacked, spaced relation seen in FIG. 3 are predesigned such that when the shaft 12 is pivoted, there will be sufficient room for the elements to flex toward each other without touching. The spaces between the flexural elements 30, 32, 34 should be large enough to allow only the desired range of motion. Excessive space will reduce the lateral stiffness of the support arrangement. The spacing between the flexural elements in FIG. 3 gives a range of pivotal motion in excess of plus or minus three degrees. Lateral compliance has been calculated to be approximately 30 microinches deflection per pound force of applied load. Maximum lateral load capacity will be in excess of 50 pounds force.

If more pivotal range is required, then more axially-symmetrical flexural elements can be added, but only in pairs, to those now illustrated. Care must be used, however, when adding elements, as lateral stiffness will be reduced significantly if the height of the flexural element stack is more than a small percentage of the difference between the inner and outer hub diameters.

As mentioned previously, the pivot point 14 is located at the intersection of the axis of the support arrangement 10 and the plane of the middle flexural element 34. Minor deviations of the pivot point from the flexural element stacks mid height point will occur when flexural elements of different thicknesses or flexural area are used. These deviations will be stable and predictable in use.

When the support arrangement 10 of the present invention is put into practice, loads are applied to the opposite ends of the shaft 12 at points 58, 60 in a direction parallel to the X-Z plane. These loads are supported laterally by the support arrangement 10 with the load path being through the inner hub 18, flexural elements 30, 34, 32 and outer hub 20, which is attached to the external support structure 28. When the loads applied at 58, 60 are unbalanced, the shaft 12 will pivot about the pivot point 14 such that the shaft's axis and the Y-axis no longer coincide. This pivoting can occur in any direction. For example, in FIG. 1, 62 and 62A show pivoting in the X-Y plane, and 64 and 64A show pivoting in the Z-Y plane. Pivoting of the shaft 12 in any other plane passing through the Y axis is possible.

Since the flexure structure 16 of the support arrangement 10 is made up of very compliant flexural elements, a small restoring moment will be generated which will oppose the unbalanced external forces. Because there are no rubbing or sliding components, this pivoting is essentially frictionless. The angular limit of pivoting which can be used is determined by the space between the flexural elements and the number of elements.

As is apparent in FIG. 1, the construction of the support arrangement 10 of the present invention does not allow rotation of the supported shaft 12 about its axis. In some applications where the present invention may be used, the supported shaft 12 will be attached to an external structure at one end. When the shaft 12 is pivoted by movement of the external structure, it will be pulled toward its structure attachment end thereby dislocating the instantaneous pivot point relative to the original pivot point 14. The present invention accommodates this pivot point dislocation with a diaphragm flexing of the flexural elements. Displacements due to mismatched temperature expansions are also accommodated by the same mechanism.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

The embodiments of the invention in which an exclusive property of right is claimed are defined as follows:

1. A frictionless support arrangement for pivotally supporting a non-rotating elongated shaft, said support arrangement comprising:
   (a) a flexure structure having a central opening for receiving the shaft therethrough; and
   (b) a pair of axially-displaced inner and outer hubs alignable along a common longitudinal axis with said flexure structure and having respective central bores for receiving the shaft therethrough along said axis;
   (c) said hubs being respectively connected to, and disposed inwardly and outwardly of, said flexure structure, one of said hubs adapted for rigid connection to the shaft and the other of said hubs adapted for rigid connection to an external support structure;

(d) said flexure structure being composed of a stiff, resiliently-flexible deformable material and defining a frictionless, laterally stiff, pivot point of the shaft located generally on said common axis and about which the shaft can pivot about any lateral pivot axis that includes said pivot point, and through a range of angular motion predefined by said flexure structure.

2. The support arrangement of claim 1 wherein said flexure structure is composed of a plurality of disk-like annular flexural elements fixed to one another and disposed in a stacked, axially spaced relation to one another along said common axis.

3. The support arrangement of claim 2 wherein said flexural elements are axially-symmetrical with respect to one another and peripherally-connected one to the next.

4. The support arrangement of claim 2 wherein said inner and outer hubs are annular-shaped and disposed respectively inwardly and outwardly of inner and outer end ones of said flexural elements.

5. The support arrangement of claim 4 wherein said inner hub is attached to said inner end flexural element at an interior peripheral edge thereof.

6. The support arrangement of claim 4 wherein said outer hub is attached to said outer end flexural element at an exterior peripheral edge thereof.

7. The support arrangement of claim 2 wherein said flexural elements are composed of a corrosion-resistant steel material.

8. The support arrangement of claim 2 wherein said flexural elements are composed of inner and outer end elements and at least one middle element located therebetween, said pivot point being aligned with said middle flexure element.

9. The support arrangement of claim 8 wherein said middle element is rigidly connected at its exterior peripheral edge to an exterior peripheral edge of said inner end element and at its interior peripheral edge to an interior peripheral edge of said outer end element.

10. The support arrangement of claim 9 wherein said inner hub is attached to said inner end flexural element at an interior peripheral edge thereof.

11. The support arrangement of claim 9 wherein said outer hub is attached to said outer end flexural element at an exterior peripheral edge thereof.

12. A frictionless support arrangement for pivotally supporting a non-rotating elongated shaft, said support arrangement comprising:

(a) a flexure structure being composed of a plurality of disk-like annular flexural elements each having a central opening for receiving the shaft therethrough and being fixed to one another and disposed in a stacked, axially spaced relation to one another along a common axis, said flexural elements being axially-symmetrical and peripherally-connected one to the next; and (b) attaching means respectively connected to, and disposed inwardly and outwardly of, said stacked flexural elements, one of said attaching means being adapted for rigid connection to the shaft and the other of said attaching means being adapted for rigid connection to an external support structure;

(c) said flexural elements being composed of a stiff, resiliently-flexible, deformable material and defining a frictionless, laterally stiff, pivot point for the shaft located generally on said common axis and about which the shaft can pivot about any lateral pivot axis that includes said pivot point, and through a range of angular motion predefined by said flexural elements.

13. In combination with an elongated shaft, a frictionless support arrangement for pivotally supporting a non-rotating shaft, said arrangement comprising:

(a) a flexure structure being composed of a plurality of disk-like annular flexural elements each having a central opening for receiving said shaft therethrough and being fixed to one another and disposed in a stacked, axially spaced relation to one another along a common axis, said flexural elements being axially-symmetrical and peripherally-connected one to the next; and (b) a pair of axially-displaced inner and outer hubs alignable along said common axis with said flexural elements and having respective central bores for receiving the shaft therethrough along said axis;

(c) said hubs being respectively connected to, and disposed respectively inwardly and outwardly to, said stacked flexural elements, one of said hubs being rigidly connected to said shaft and the other of said hubs being adapted for connection to an external support structure;

(d) said flexural elements being composed of a stiff, resiliently-flexible, deformable material and defining a frictionless, laterally stiff, pivot point for said shaft located generally on said common axis and about which said shaft can pivot about any lateral pivot axis that includes said pivot point, and through a range of angular motion predefined by said flexural elements.

14. The support arrangement of claim 13 wherein said inner and outer hubs are annular-shaped and disposed respectively inwardly and outwardly of inner and outer end ones of said flexural elements.

15. The support arrangement of claim 14 wherein said inner hub is attached to said inner end flexural element at an interior peripheral edge thereof.

16. The support arrangement of claim 14 wherein said outer hub is attached to said outer end flexural element at an exterior peripheral edge thereof.

17. The support arrangement of claim 13 wherein said flexural elements are composed of a corrosion-resistant steel material.

18. The support arrangement of claim 13 wherein said flexural elements are composed of inner and outer end elements and at least one middle element located therebetween, said pivot point being aligned with said middle flexure element.

19. The support arrangement of claim 18 wherein said middle element is rigidly connected at its exterior peripheral edge to an exterior peripheral edge of said inner end element and at its interior peripheral edge to an interior peripheral edge of said outer end element.

20. The support arrangement of claim 19 wherein said inner hub is attached to said inner end flexural element at an interior peripheral edge thereof.

21. The support arrangement of claim 19 wherein said outer hub is attached to said outer end flexural element at an exterior peripheral edge thereof.

* * * * *

UNITED STATES PATENT AND TRADEMARK OFFICE
CERTIFICATE OF CORRECTION

PATENT NO. : 4,934,860

DATED : June 19, 1990

INVENTOR(S) : David A. Garrett

It is certified that error appears in the above-identified patent and that said Letters Patent is hereby corrected as shown below:

Column 6, Claim 13, Line 25 delete "to" and insert --of--.

Signed and Sealed this

Eighteenth Day of June, 1991

Attest:

Attesting Officer

HARRY F. MANBECK, JR.

Commissioner of Patents and Trademarks